United States Patent [19]

Geiges

[11] Patent Number: 4,490,940

[45] Date of Patent: Jan. 1, 1985

[54] BLOOMING PLANT IMPLANT

[76] Inventor: Albert Geiges, 3157 Mechanicsville Rd., Bensalem, Pa. 19020

[21] Appl. No.: 502,211

[22] Filed: Jun. 8, 1983

[51] Int. Cl.³ .............................................. A01G 1/06
[52] U.S. Cl. ..................................................... 47/58
[58] Field of Search ...................................... 47/58, 1

[56] References Cited

U.S. PATENT DOCUMENTS

| 514,482 | 2/1894 | Mayer-Schliewen | 40/1 |
| 3,955,321 | 5/1976 | Payton | 47/58 |

Primary Examiner—Robert A. Hafer
Assistant Examiner—D. D. DeMille
Attorney, Agent, or Firm—Lawrence J. Shurupoff

[57] ABSTRACT

A method and system for implanting a gift or message within a blooming plant includes removing a plug from the base portion of a plant bud to form a channel therein through which a gift or message is implanted within a central portion of the plant. The plug is replaced and sealed with grafting wax. Upon subsequent blooming of the plant, the gift or message is displayed to open sight.

12 Claims, 5 Drawing Figures

BLOOMING PLANT IMPLANT

BACKGROUND OF THE INVENTION

1. Field of the Invention

This invention relates generally to a method for implanting a gift or message within a blooming plant as well as to a plant modified by such method. More particularly, this invention concerns the removal of a plug from the base portion of a plant bud thereby forming a channel through which a gift or message is implanted within the plant.

2. Description of the Prior Art

In the field of blooming plants and in the commercial marketing of blooming plants such as roses, a long standing drawback has been the relatively anti-climactic effect on the recipient of a bouquet or arrangement of blooming plants or flowers once the initial pleasure or satisfaction experienced during the presentation of the gift has expired. That is, the typical recipient of a bouquet or arrangement of blooming flowers quickly looses interest in such gift thereby decreasing their perceived overall value as a gift.

One attempt to increase ones interest in a growing plant is disclosed by Payton in U.S. Pat. No. 3,955,321, wherein a plug is withdrawn from the wall of a living pumpkin while still attached to its vine. A plastic bag is then introduced into the hole formed upon removal of the plug and an object is inserted into the bag whereupon the bag is tied and pushed entirely into the pumpkin. The plug is then replaced and the pumpkin is grown to maturity and subsequently harvested at which time the foreign object, which may be a gift such as currency, will be discovered. While such method may be applicable to plants such as pumpkins or gourds, a need still exists for increasing the interest and anticipation of a recipient of a bouquet or arrangement of blooming plants such as roses.

SUMMARY OF THE INVENTION

Accordingly, this invention has been made to overcome the problems described above, and therefore has an object to provide a method for implanting a message or gift within blooming plants and flowers so as to increase the interest and appreciation of the recipient of such plants and to create a sense of excitement or anticipation in such recipients.

The above and other objects are achieved according to the present invention by the provision of a method for implanting a message or gift within a living plant in the bud stage of its development. As the bud slowly opens spontaneously, the message or gift is slowly revealed thereby enhancing, augmenting and sustaining the initial pleasure of the recipient of such plant modified in accordance with the invention.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENT

Figure 1:
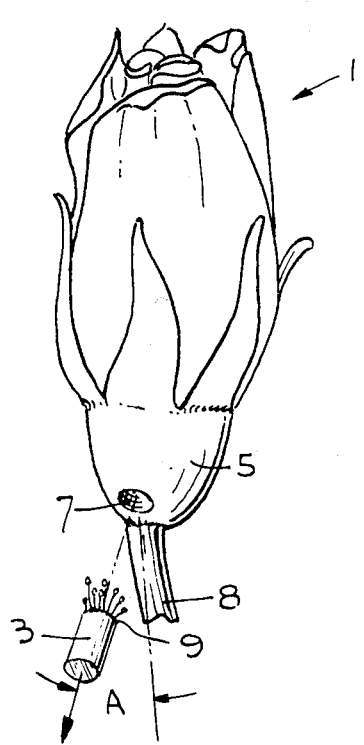
FIG. 1 is a front perspective view of a flower bud showing the removal of a plug from the base section thereof.

The method and assembly in accordance with the present invention will now be described in conjunction with the accompanying FIG. 1, within which, for example, a blooming or flowering plant 1 is disclosed. The bud or blossom 1 is typically a bud of a flowering plant such as typically provided within a bouquet or flower arrangement such as a rose bud. While roses are most readily adaptable to the method of the present invention, tulips have been found to be readily adaptable to the method of the present invention as well. While the invention is primarily directed to cut flowers, potted plants or rooted garden plants may also be so modified.

The first step in the implant process is to remove a plug member 3 from the base portion or receptacle 5 of a blooming plant so as to temporarily form a channel 7 therein. Any rigid channel member having relatively thin walls may be used to remove the plug 3. For example, a rigid plastic straw or a thin walled pipe may be used to remove plug 3. The outer diameter of the straw or channel member should be on the order of approximately one quarter inch so as to form channel 7 with a corresponding diameter. The channel member is simply pushed through the base portion 5 of the bud 1 such that plug 3 becomes wedged within the channel member and is removed from base portion 5 upon removal of the channel member.

When removing the plug 3 from base 5 of bud 1 it has been found preferable to limit the angle formed by the axis of channel 7 with respect to the axis of the stem 8 of bud 1 to an arc A of less than 30°. In addition, the plug 3, shown as a tubular plug in FIG. 1, should be removed in a manner such that the channel 7 communicates with the interior hollow portion of the bud 1. That is, channel 7 should be bored in a manner which results in the opening of such channel into the interior portion of the bud at a point near the center of the bud and preferably at a point within the natural internal cavity defined by the plurality of petals of the bud 1. Typically, channel 7 will have an axial length ranging between ½ and 1 inch. A good indication of a properly bored channel is the existence of a portion of the reproductive organ 9 of the bud 1 upon the inner end portion of the plug 3 upon removal of the plug from the bud. The presence of such reproductive organ 9 indicates that access to an internal chamber defined by the petals of the bud 1 has been effected. Access to this chamber is required for the proper implantation of a message or gift therein.

Figure 2:
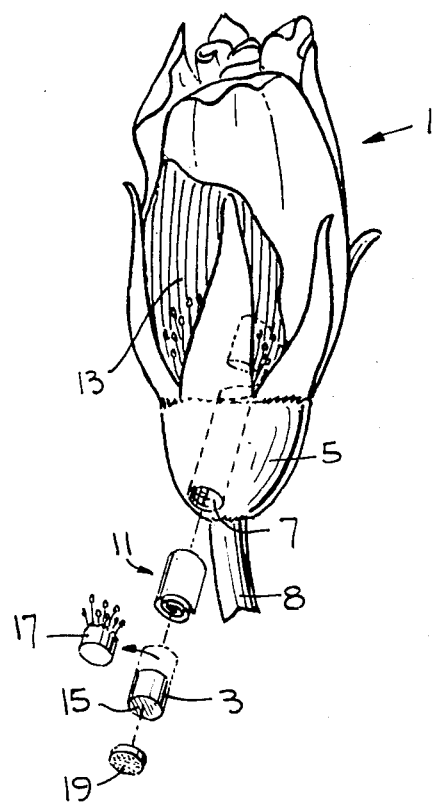
FIG. 2 is a front perspective view of the bud of FIG. 1 showing the relative placement of the components of the invention.

As shown in FIG. 2, an object 11 such as a scrolled message or small gift is inserted within channel 7 and pushed therethrough until it has gained access to cavity or chamber 13 within the bud 1 so as to be removed from open sight. As the plug 3 is replaced and sealed. That is, object 11 is placed to lie above receptacle 5 so as to be surrounded by the petals of blossom 1. Any suitable object may be used as a ramrod for pushing the object 11 through channel 7, such as a dowel pin member having a diameter less than that of channel 7.

After implanting the object 11 within the cavity 13, the plug 3 is removed from the channel member with, for example, a pin and reinserted within channel 7 such that the outer surface 15 of the plug 3 is returned to its original relative position with respect to the base 5 of bud 1, that is, flush with the surface of base 5. Should the bud 1 be of relatively small dimensions, an axial end portion 17 of the inner end of plug 3 may be removed so as to provide additional room within the bud 1 for the object 11. Once the plug 3 has been reinserted to its original natural position, a surface coating 19 may be applied over the incision defining the outer boundaries of channel 7. The coating 19 may be a grafting wax or simply a melted candle wax provided for the purpose of minimizing the trauma to the bud 1 caused by the implant of object 11 therein.

Figure 3:
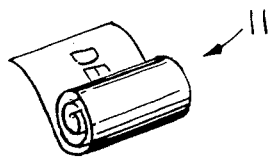
FIG. 3 is a perspective view of a message in scroll form suitable for implant within the bud of FIG. 1.
Figure 4:
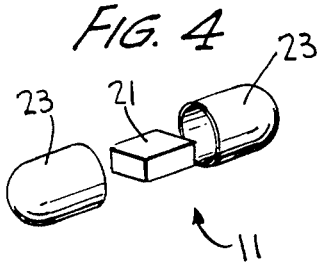
FIG. 4 is an exploded perspective view of an encapsulated gift suitable for implant within the bud of FIG. 1.

As shown in FIG. 3, object 11 may be formed of a scrolled cylindrical message or alternatively, as shown in FIG. 4, object 11 may include a gift 21 such as a gem. Gift 21 may further be encapsulated within capsule 23 such as a standard gelatin capsule. Capsule 23 would therefore shield the gift 21 from any adverse effect of contact with the interior of the bud 1. Alternatively, the scrolled message may be shielded by such encapsulation, and may be taped closed to maintain a scrolled configuration in order to facilitate implantation within the bud 1.

Figure 5:
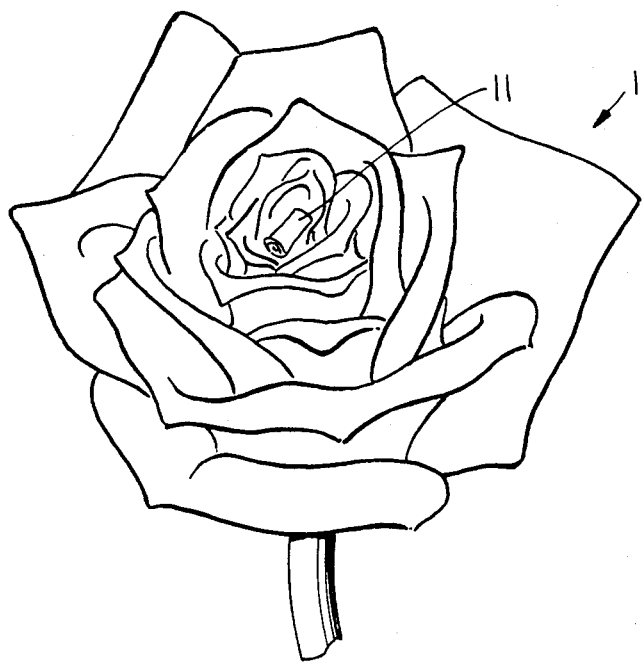
FIG. 5 is a perspective plan view of the bud of FIG. 1 showing the message or gift disposed therein after blooming.

FIG. 5 shows the final results of the implant method wherein object 11 is displayed within the central portion of the bud 1 after it has bloomed. It can be appreciated that one receiving a bud such as shown in FIG. 1 and modified in accordance with the method set forth above, would, upon being told of the message or gift implanted therein typically experience greater interest in such plant than a plant not so modified. Moreover, in addition to the increase in initial pleasure of receiving such modified plant, the interest of the recipient would typically be increased and sustained as a result of the anticipation created by the expectation of receiving a message or gift upon blooming of the bud. This period may vary from a day to a week, depending upon the stage of development of the bud and the type of blooming plant used. Moreover, blooming times for various plants modified in accordance with the invention may readily be determined such that the message or gift will be displayed spontaneously and automatically to open sight upon a predetermined date.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for implanting an object within a blossom capable of blooming, said blossom having a receptacle and a plurality of petals and wherein said method comprises:
   removing a plug member from said blossom so as to form a channel having a central axis, said channel leading into an interior portion of said blossom;
   inserting said object through said channel such that said object lies above said receptacle and is surrounded by said petals of said blossom;
   replacing said plug member within said channel, whereby upon opening of said blossom said object is revealed.

2. A method according to claim 1 which further comprises applying a protective coating over said plug member after said replacing said plug member.

3. A method according to claim 1 which further comprises removing an inner end portion of said plug member to facilitate insertion of said object into said channel.

4. A method according to claim 1 wherein said plant comprises a stem having an axis and wherein said method further comprises removing said plug from said receptacle such that said central axis of said channel forms with said axis of said stem an angle of less than 30°.

5. A method according to claim 1 wherein said plant comprises a rose bud and wherein said object comprises a message scroll.

6. A method according to claim 1 wherein said plant comprises a rose bud and wherein said object comprises a gift object.

7. An article of commerce comprising:
   a living blossom not fully opened, said blossom having a man-made object disposed therein lying above the receptacle of the blossom, said object hidden from view by the unopened petals, such that upon opening of said petals, said object is exposed to sight.

8. The article of claim 7 wherein said blossom is a cut flower.

9. The article of claim 7 wherein said blossom is on a potted plant.

10. The article according to claim 7 wherein said article comprises a rose in bud form and wherein said object comprises a message scroll.

11. The article according to claim 7 wherein said article comprises a rose in bud form and wherein said object comprises a gem.

12. The article according to claim 7 wherein said article comprises a tulip in bud form.

* * * * *

UNITED STATES PATENT AND TRADEMARK OFFICE
CERTIFICATE OF CORRECTION

PATENT NO. : 4,490,940
DATED : January 1, 1985
INVENTOR(S) : Albert Geiges

It is certified that error appears in the above-identified patent and that said Letters Patent is hereby corrected as shown below:

Column 2, line 67, delete "As the plug 3 is replaced and sealed."

Column 4, line 14, after "blossom;" insert -- and --.

Signed and Sealed this

Fourteenth Day of May 1985

[SEAL]

Attest:

DONALD J. QUIGG

Attesting Officer

Acting Commissioner of Patents and Trademarks